(12) United States Patent
Ballard (10) Patent No.: US 6,321,243 B1
(45) Date of Patent: *Nov. 20, 2001

(54) LAYING OUT A PARAGRAPH BY DEFINING ALL THE CHARACTERS AS A SINGLE TEXT RUN BY SUBSTITUTING, AND THEN POSITIONING THE GLYPHS

(75) Inventor: Dean D. Ballard, Seattle, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/883,666

(22) Filed: Jun. 27, 1997

(51) Int. Cl.[7] ........................................ G06F 7/00
(52) U.S. Cl. ........................ 707/517; 707/518; 707/519
(58) Field of Search .................................... 707/517, 507, 707/526, 522; 345/342, 467; 709/103

(56) References Cited

U.S. PATENT DOCUMENTS

| | | | | |
|---|---|---|---|---|
| 5,144,693 | * | 9/1992 | Morgan | 395/158 |
| 5,307,451 | * | 4/1994 | Clark | 345/427 |
| 5,412,771 | * | 5/1995 | Fenwick | 345/468 |
| 5,416,898 | * | 5/1995 | Opstad et al. | 395/150 |
| 5,533,174 | * | 7/1996 | Flowers, Jr. et al. | 358/1.15 |
| 5,579,030 | * | 11/1996 | Karow | 345/471 |
| 5,586,241 | * | 12/1996 | Bauermeister et al. | 345/467 |
| 5,729,666 | * | 3/1998 | Konsella et al. | 358/1.11 |
| 5,802,539 | * | 9/1998 | Daniels et al. | 707/542 |
| 5,926,189 | * | 7/1999 | Beaman et al. | 345/467 |

OTHER PUBLICATIONS

A Document Preparation Paradigm Based on the Specification Method of Layout Structure, Watanabe Et Al, Tencon '94. IEEE Region 10's Ninth Annual International Conference. Proceedings of 1994, 1994 pp. 887–891 vol. 2.*

A Document Skew Detection Method Using Run–Length Encoding an DTHE Hough Transform, Hinds Et Al, IEEE, Pattern Recognition, 1990. Proceedings., 10th International Conference on, vol.: i, pp.464–468, 1990.*

Mastering Windows 3.1 Special Edition, 1993, Cowart, R., SYBEX, Inc., pp. 398–401.*

* cited by examiner

Primary Examiner—Stephen S. Hong
Assistant Examiner—Cesar B. Paula
(74) Attorney, Agent, or Firm—Banner & Witcoff, Ltd.

(57) ABSTRACT

Laying out a paragraph using a layout services library. An entire paragraph is defined as a single text run. The text run is laid out by substituting glyphs for the characters of the text run and then positioning the glyphs. After the text run is laid out, the length of the text run is compared to the line length. If the length of the text run exceeds the line length, then the text run is divided into a parent text run and a child text run. If justification is enabled, then the parent text run is justified. If a child text run is created, then the length of the child text run is compared to the line length. If the length of the child text run exceeds the line length, then the process is repeated until the length of the last child text run does not exceed the line length. A layout services library provides text processing functions which support the paragraph layout and the justification.

19 Claims, 5 Drawing Sheets

LAYING OUT A PARAGRAPH BY DEFINING ALL THE CHARACTERS AS A SINGLE TEXT RUN BY SUBSTITUTING, AND THEN POSITIONING THE GLYPHS

FIELD OF THE INVENTION

This invention relates in general to laying out text, and in particular to laying out a paragraph using a layout services library.

BACKGROUND OF THE INVENTION

Electronic documents have proliferated as computers have become common fixtures in offices, schools and homes. In many instances, electronic documents have replaced paper documents. For example, an electronic document may be distributed instead of a paper memorandum. To encourage the use of an electronic document rather than a paper document, the text of the electronic document must be legible and linguistically accurate. The text of an electronic document is typically rendered using one or more fonts such as Arial, Times New Roman or Courier. A font is a particular style of typeface. A font designed for an electronic document is designed to increase the readability of the document when displayed on a pixel display device, such as a monitor or a printer. To render the text of an electronic document in a particular font, the text is represented by glyphs. A glyph is a representation of one or more characters. A single glyph may represent a single character such as the lower case letter "f" or a single glyph may represent a string of characters such as the lower case letters "fi". To render a document on a display device, the characters of the document are converted to glyphs and the glyphs are displayed on the display device.

Typically, font information, including glyph information, is stored in a set of font tables. For example, the OpenType Layout font standard promulgated by Microsoft Corporation of Redmond, Wa., assignee of the present invention, includes five font tables: (1) a glyph substitution table, (2) a glyph position table, (3) a justification table, (4) a baseline table, and (5) a glyph definition table. The OpenType Layout font tables support contextual mapping between characters and glyphs, including ligatures, positional forms, alternatives, and other substitutions.

A word processing program may use the information in the font tables to layout and render the text of an electronic document. An electronic document is laid out before the document is rendered on an output device such as a display device. Document layout typically includes paragraph layout. To layout a paragraph, a word processing program breaks the paragraph text into separate lines and then lays out each line separately. However, once a line is laid out, the line may expand or contract which may require that the word processing program re-break the paragraph text. If the word processing program re-breaks the text, then the text must also be laid out again. Repeatedly re-breaking and re-laying out the text increases the time required to render the paragraph. A paragraph could be rendered in less time if the repeated line breaking and lay out could be eliminated. The faster a paragraph is laid out, the faster a document may be displayed. For example, to display the twenty-fifth page of a document, the word processing program must layout twenty-five pages of text, each page of text typically having one or more paragraphs.

If justification is enabled, then each line of the paragraph must also be justified. A line may be justified by the word processing program by using justification suggestions stored in the font tables. The justification suggestions list particular actions that the word processing program may use to adjust the glyphs in a line of text.

To layout a paragraph or to justify text, a word processing program must be able to access and manipulate the font tables and the information contained in those tables. Such manipulation and utilization requires a level of complexity which may not be available in many word processing programs. Therefore, many of the advanced typography features available in the font tables, have not been utilized by word processing programs. If a word processing program could use an interface such as a layout services library to access and manipulate the font tables, then the word processing program could fully utilize the features available without needing an increased level of complexity.

Accordingly, there is a need in the art for a more efficient method for laying out a paragraph and justifying a line of text. There is also a need in the art for a layout services library to interface with the font tables to support paragraph layout and justification.

SUMMARY OF THE INVENTION

The present invention meets the needs described above by providing a method for laying out a paragraph to eliminate repeated line breaking and by providing a layout services library to access the font tables to support paragraph layout and justification. The layout services library accesses the font tables and provides text layout suggestions to the word processing program. The word processing program interfaces with the layout services library via a set of application program interfaces.

To layout a paragraph, the word processing client defines the entire paragraph as a text run, regardless of the length of the paragraph. The text run is laid out by substituting glyphs for the characters of the text run and positioning the glyphs. To substitute glyphs for the characters of the text run, the word processing client issues a substitute glyph function call. In response, the layout services library returns a suggested list of glyph substitutions for the characters of the text run. To position the glyphs, the word processing client issues a position glyph function call. The layout services library accesses the glyph position table and returns x-placement, y-placement, and advance values for the glyphs in the text run.

Once the text run is laid out, the length of the text run is compared to a predetermined line length. The word processing program calculates the length of the text run by issuing a calculate length function call. The layout services library returns the position of the first character and the position of the last character of the text run to the word processing program. The word processing program uses the position information to calculate the length of the text run. The word processing program also compares the length of the text run to the predetermined line length. If the length of the text run exceeds the predetermined line length, then the text run is divided into a parent text run and a child text run. The parent text run includes the portion of the text run which does not exceed the predetermined line length and the child text run includes the remainder of the text run. If the text run uses a Latin typeface, then the text run is typically divided at a space character or if hyphenation is enabled, after a syllable. Text runs using non-Latin typefaces may be divided at other points.

To locate a space character, the word processing program requests the identification of the character at the end of the line by issuing a character identification function call. The layout services library identifies the character at the end of the line. If the character at the end of the line is a space character, then the word processing program divides the text run at the space character. If the character is not a space character, then the word processing program backs up along the text run until a space character is identified. If the length of the child text run exceeds the predetermined line length, then the line breaking process is repeated using the child text run, and the child text run is divided into a first child text run and a second child text run. The layout process is repeated until the length of the last child text run does not exceed the line length.

If justification is enabled, then the word processing program justifies each line of the paragraph. For example, to justify a paragraph, the word processing program justifies the parent text run and any child text runs. To justify a text run, the word processing client selects a justification priority and issues a justification information function call. The justification priority indicates the severity of the actions allowed to justify a line. The layout services library receives the justification information function call and determines whether the font supports the requested justification priority. If the font supports the requested justification priority, then the layout services library determines whether glyph substitution or glyph positioning is required by the justification priority. The layout services library returns a priority support value, a glyph substitution change value and a glyph position change value to the word processing program to indicate whether the requested justification priority is supported, and if the justification priority is supported, whether glyph substitution or glyph positioning is required.

If the justification priority is supported, and if glyph positioning and substitution are not required, then the word processing program issues a justify text function call. In response to the justify text function call, the layout services library determines justified placement values and justified advance values for the text run. If glyph substitution is required by the justification priority, then the word processing program must issue a glyph substitution function call before the justify text function call. Similarly, if glyph positioning is required, then the word processing program must issue a glyph positioning function call before the justify text function call. If the text run is not justified using the selected justification priority, then the word processing program may select a more severe justification priority.

DETAILED DESCRIPTION

The present invention is directed to laying out a paragraph using a layout services library. In one embodiment, the invention may be incorporated into an operating system such as the "WINDOWS" operating system marketed by Microsoft Corporation of Redmond, Wa. In other embodiments, the invention may be incorporated into an Internet browser such as the "INTERNET EXPLORER" browser or a publishing program such as the "PUBLISHER" program, both marketed by Microsoft Corporation. Briefly described, an entire paragraph is defined as a single text run. The text run is laid out by substituting glyphs for the characters of the text run and then positioning the glyphs. After the text run is laid out, the length of the text run is compared to the line length. If the length of the text run exceeds the line length, then the text run is divided into a parent text run and a child text run. The parent text run includes the portion of the text run which does not exceed the line length and the child text run includes the remainder of the text run. If justification is enabled, then the parent text run is justified. If a child text run is created, then the length of the child text run is compared to the line length. If the length of the child text run exceeds the line length, then the process is repeated until the length of the last child text run does not exceed the line length. A layout services library provides text processing functions which support paragraph layout and justification.

Exemplary Operating Environment

Figure 1:
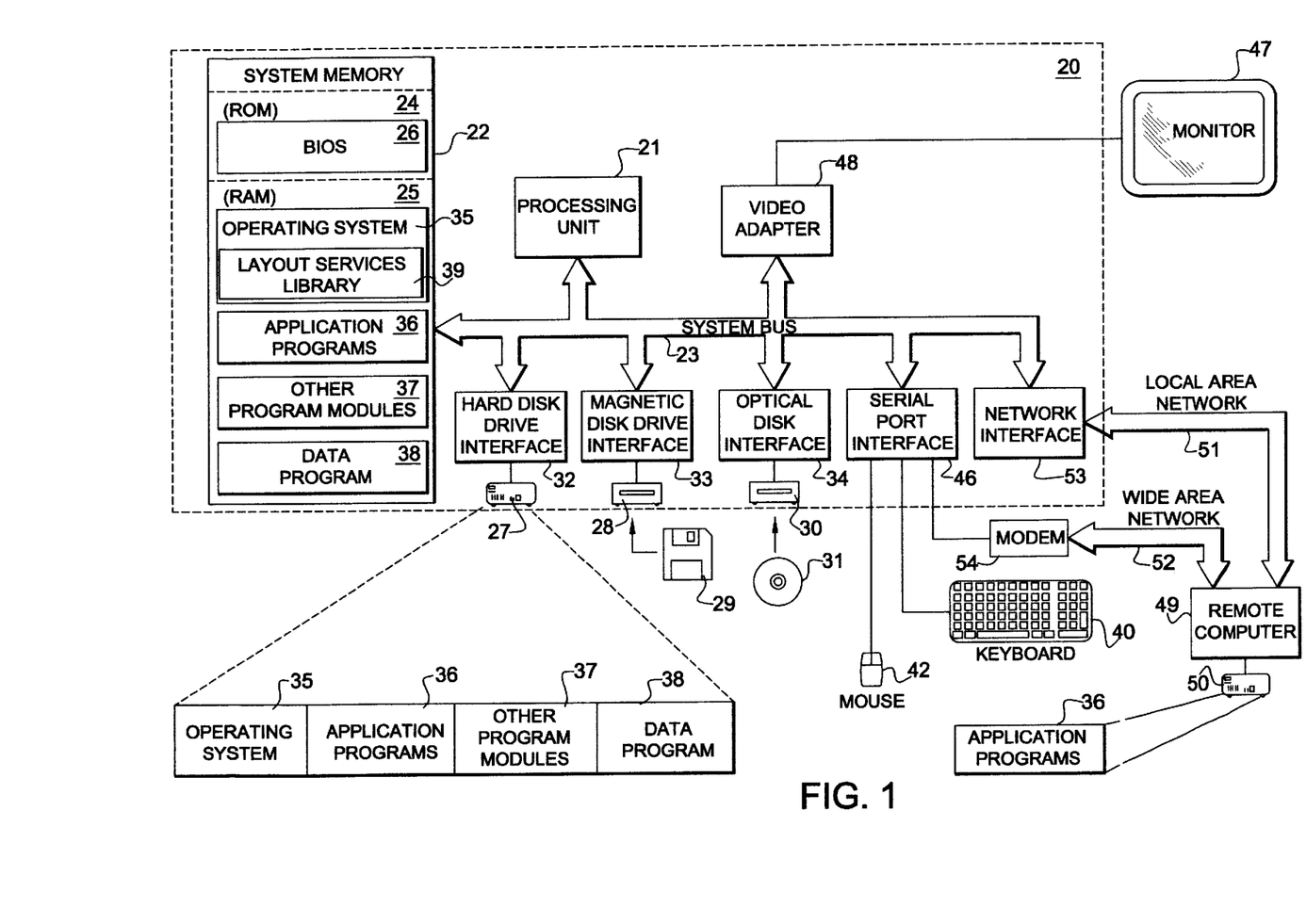
FIG. 1 is a block diagram of a personal computer illustrating the operating environment for an embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, program data 38 and a layout services library 39. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Layout Services Library Embodiment

One embodiment of the present invention may be used by a word processing program to render a paragraph on a display device using a layout services library and is referred to herein as the layout services library embodiment. The layout services library embodiment may be used with a font which supports the OpenType Layout standard. The OpenType Layout font standard defines glyphs, scripts, language systems and features. A glyph is a representation of one or more characters. For example, a single glyph may represent a single character such as the lower case letter "f" or a single glyph may represent a string of characters such as the lower case letters "fi". A script is a group of related characters which may be used by one or more languages. Latin, Arabic and Thai are examples of scripts. A script may be divided into language systems. For example, the Latin script is used in the English, French and German language systems. Each language system may support different functions or features. An OpenType Layout font may support a number of features, including a swash feature and a ligature feature. The swash feature replaces a default glyph with an alternative glyph, and the ligature feature replaces a string of glyphs with a ligature glyph.

An OpenType Layout font uses five font tables, (1) a glyph substitution table, (2) a glyph position table, (3) a justification table, (4) a baseline table, and (5) a glyph definition table. The font tables include information to support the features of the font. For example, the glyph substitution table includes information for glyph substitutions to support single glyph substitution, one-to-many substitution (ligature decomposition), aesthetic alternatives substitution, multiple glyph substitution (ligatures), and contextual glyph substitution. The glyph position table includes information for positioning glyphs by providing an x-placement value, a y-placement value and an advance value. The glyph positioning information supports a single adjustment (for example, to support a superscript or subscript), a pair adjustment (for example, to support kerning), a cursive attachment (for example, to support cursive scripts), a MarkToBase attachment (for example, to support positioning vowels, diacritical marks, or tone marks in Arabic, Hebrew and Vietnamese), a MarkToLigature attachment (for example, to support positioning vowels around ligatures), a MarkToMark attachment (for example, to support positioning tone marks with respect to vowel diacritical marks in Vietnamese), and contextual positioning (for example, to support positioning one or more glyphs in context). The base line table provides information for aligning lines of text. The justification table provides information for justifying text. The glyph definition table provides information for classifying of glyphs and for identifying attachment points and ligature carets.

A word processing program utilizes the functions provided by the layout services library to layout text. The layout services library accesses the font tables and provides text layout suggestions to the word processing program. The word processing program may implement some, all or none of the suggestions received from the layout services library. The word processing program accesses the layout services library by issuing function calls to the library. Typically, the word processing program defines a text run which is associated with a function call. A text run is a piece of text using a particular font at a particular size in a particular script and a particular language system. The word processing program may also define additional parameters for a function. For example, to invoke the justify function, the word processing client defines a text run and a target line length.

In response to a function call, the layout services library returns layout data to the word processing program. The layout data is typically stored in a data structure defined by the layout services library. To implement the layout suggestions contained in the data structure, the word processing program identifies the data structure to the rasterizer which uses the layout suggestions to render the text. The function calls and the data structures used to support the paragraph layout method are discussed in more detail in the section entitled "Layout Services Library Interface".

Layout Services Library System Architecture

Figure 2:
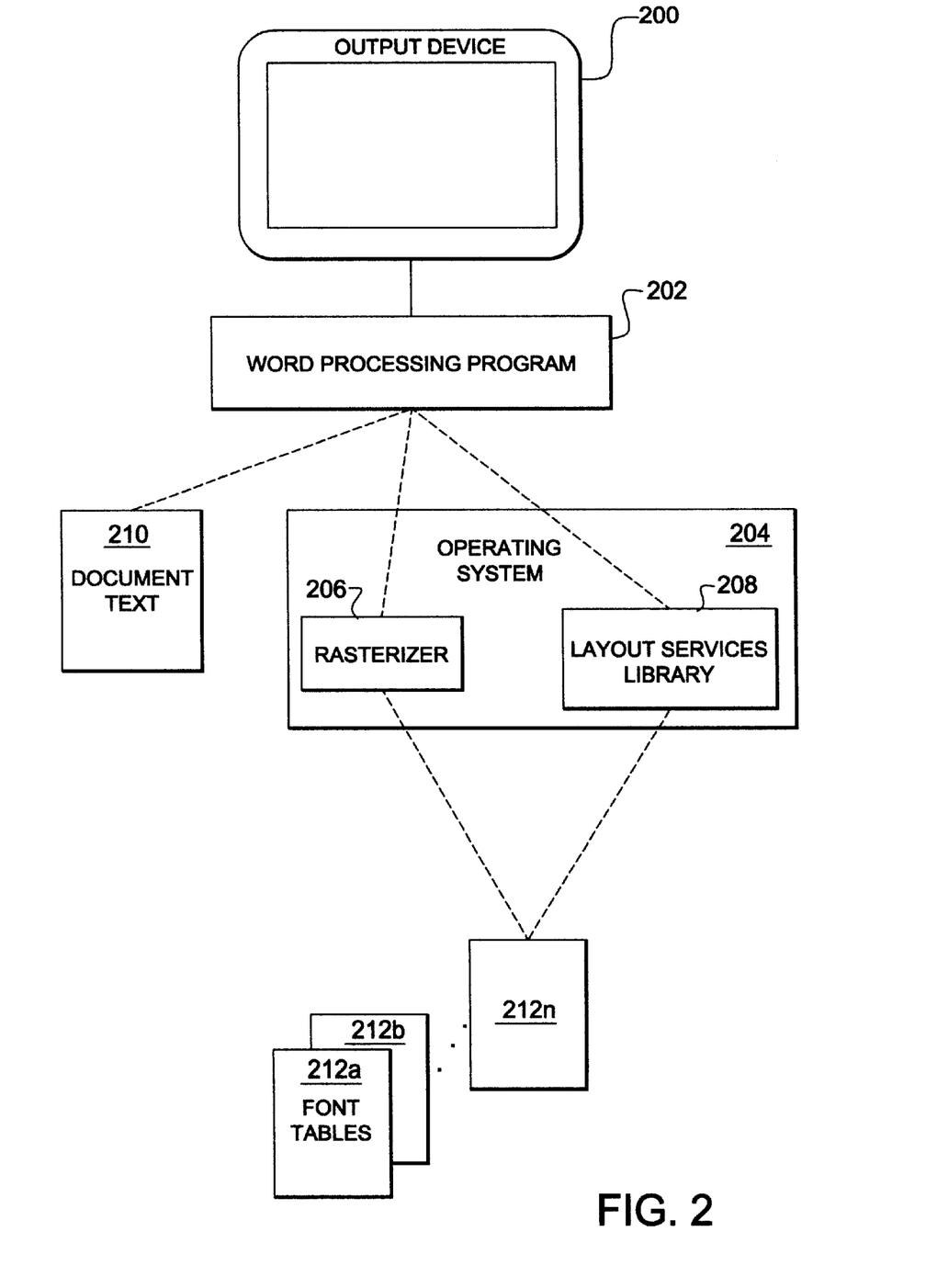
FIG. 2 is a block diagram illustrating the architecture of a computer system for an embodiment of the present invention.

The architecture for an exemplary system which implements the layout services library embodiment is illustrated in FIG. 2. A word processing program 202 or other program displays text from a document text file 210 on an output device such as a display device 200. The document text is rendered using the text processing functions provided by the layout services library 208. Although the layout services library 208 is shown as part of the operating system 204 in FIG. 2, the layout services library 208 may also be a dynamically linked library positioned between the word processing program 202 and the operating system 204. The layout services library 208 interfaces with one or more sets of font tables 212a, 212b . . . 212n. The layout services library 208 accesses the font tables 212, 212b . . . 212n to provide the word processing program 202 with layout information and layout suggestions. The word processing program 202 may be considered a client process and the layout services library 208 may be considered a server process. The word processing program 202 communicates with the layout services library 208 using a set of application programming interfaces ("API's"). To access an API, the word processing program issues a function call to the layout services library.

In response to a function call from the word processing program, the layout services library accesses the font tables and provides layout information to the word processing program. The layout information may be used by the word processing program to lay out a paragraph. A word processing program typically specifies characters and features for the layout and the layout services library converts the characters and features into the appropriate glyphs and table lookups.

To display the document text 210 on the display device 200, the word processing program 202 uses a rasterizer 206. Typically, the rasterizer 206 is located within the operating system 204. The rasterizer 206 may access information from the font tables 212 to render the text on the output device 200.

Paragraph Layout

Figure 3:
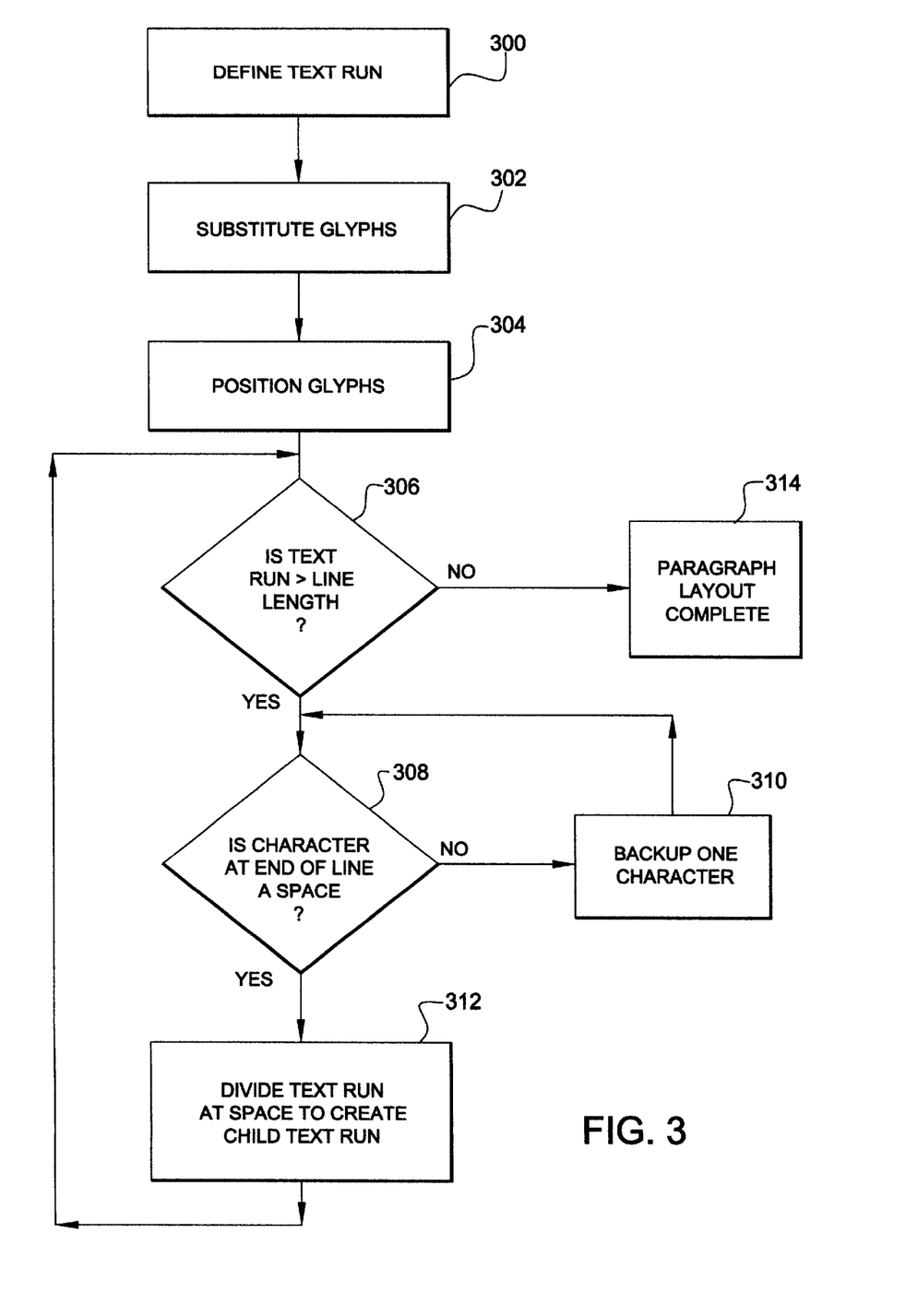
FIG. 3 is a flow diagram illustrating the steps for laying out a paragraph in accordance with an embodiment of the present invention.

The steps for laying out a paragraph using a layout services library are shown in FIG. 3. In step 300, the word processing program defines the entire paragraph as a single text run. The text run is then laid out in steps 302–304. In step 302, the word processing client issues a substitute glyph function call to the layout services library. In response, the layout services library accesses the font tables to determine which glyphs should be substituted for which characters. A suggested list of glyph substitutions is returned by the layout services library. Once the glyphs are substituted for the characters of the text run, then the word processing program issues a position glyphs function call in step 304. The layout services library accesses the glyph position table to determine the glyph position information for the text run. The layout services library returns the glyph position information including x-placement, y-placement and advance values for each of the glyphs in the text run.

Once the text run has been laid out, then the length of the text run is compared to a predetermined line length in step 306. To determine the length of the text run, the word processing program issues a calculate length function call to the layout services library. In response, the layout services library converts the glyph positions of the text run to character positions and determines the start position and the end position for the text run. The layout services library returns coordinates for the start position and the end position to the word processing program. The start position describes the coordinate for the left or top of the first character, and the end position describes the coordinate for the right or bottom of the last character for a right-to-left layout direction. The word processing program compares the start and end positions to the line length to determine whether the text run exceeds the line length. If the length of the text run is less than or equal to the line length, then the paragraph layout is complete and the No branch is followed from step 306 to step 314. If the text run is greater than the line length, then the Yes branch is followed from step 306 to step 308.

In step 308, the word processing program issues a character identification function call to the layout services library to request the identification of the character located at the end of the line. The layout services library converts the glyph positions to character positions and determines the identity of the character at the end of the line. If the character at the end of the line is a space, then the Yes branch is followed from step 308 to step 312 and the text run is divided. The text run is divided into a parent text run and a child text run in step 312. The word processing program divides the text run at the space character so that the parent text run includes the text which does not exceed the line length and the child text run includes the remainder of the text run.

If the character at the end of the line is not a space character, then the word processing program backs up one character position and requests the identification of the character at that character position in step 310. If the layout direction is left-to-right, then the word processing program requests the identification of the character to the immediate left of the character at the end of the line. If the layout direction is right-to-left, then the word processing program requests the identification of the character to the immediate right of the character at the end of the line. The word processing program continues to back up the text run until a space character is found. Once a space character is found, then the text run is divided in step 312.

From step 312 the method proceeds back to step 306. In step 306, the length of the child text run is compared to the line length. If the length of the child text run is less than or equal to the line length, then the paragraph layout is complete and the method proceeds to step 314. However, if the length of the child text run exceeds the line length, then the method proceeds to step 308. In step 308, the word processing program requests the identification of the character at the end of the line. If the character at the end of the line is not a space character, then the method proceeds to step 310. In step 310, the word processing program backs up one character position and requests the identification of the character at that location. The word processing program continues to back up the line until a space character is found. Once a space character is found, the method proceeds to step 312 and the child text run is divided at the space character into a first child text run and a second child text run. Steps 306–312 are repeated until the last child text run does not exceed the line length and the paragraph layout method ends at step 314.

Justification

If justification is enabled, then the word processing program justifies the text run on a line by line basis. Once the text run is divided into a parent text run and a child text run in step 312, the parent text run may be justified by following the steps illustrated in FIGS. 4A and 4B. In step 400 of FIG. 4A, a text run is defined. The parent text run defined in step 312 may be used as the text run of step 400. Once the text run is defined, a determination is made in step 402 as to whether the length of the text run is equal to the line length. If the length of the text run is equal to the line length, then the Yes branch is followed from step 402 to step 420 and justification is complete. If the length of the text run is not equal to the line length, then the No branch of step 402 is followed to step 404. In step 404, the word processing program selects a justification priority. The justification priority indicates the severity of the modifications allowed to justify the line. For example, a first justification priority may allow only the mildest type of adjustment to satisfy the justification priority, such as word spacing adjustments.

Figure 4A:
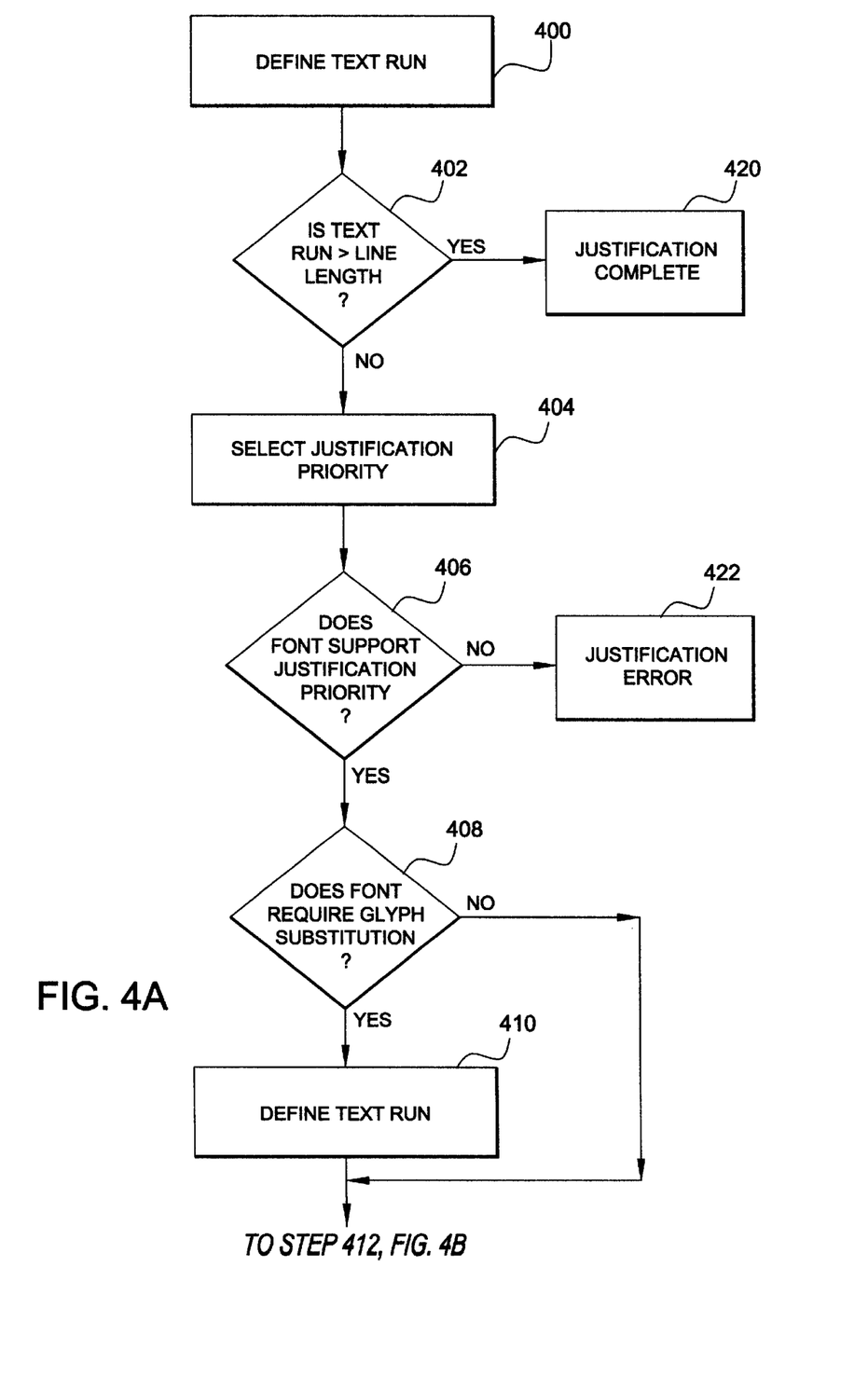
FIGS. 4A and 4B are flow diagrams illustrating the steps for justifying a text run in accordance with an embodiment of the present invention.

Subsequent justification priorities would allow more severe techniques to achieve justification, such as resubstituting or repositioning glyphs.

Once the word processing program selects the justification priority in step 404, the word processing program issues a justification information function call to the layout services library. The justification information function call requests confirmation that the requested justification priority is supported by the font. The layout services library accesses the font tables to determine whether the justification priority is supported, and if the justification priority is supported, whether glyph substitution and/or glyph positioning is required. In step 406, the word processing program receives the layout services library's response to the justification information function call. If the response indicates that the requested justification priority is supported, then the method proceeds to step 408. If the response indicates that the requested justification priority is not supported, then a justification error occurs, and the method proceeds from step 406 to step 422.

If the requested justification priority is supported, then the method proceeds from step 406 to step 408. In step 408, the word processing program reviews the response to the justification information function call to determine whether glyph substitution is required. If glyph substitution is required, then the Yes branch is followed from step 408 to step 410. The word processing program issues a substitute glyph function call to the layout services library in step 410. The substitute glyph function call includes a parameter to indicate the justification priority. In response to the substitute glyph function call, the layout services library returns a list of substituted glyphs. If the justification priority does not require glyph substitution, then the No branch is followed from step 408 to step 412 of FIG. 4B.

Figure 4B:
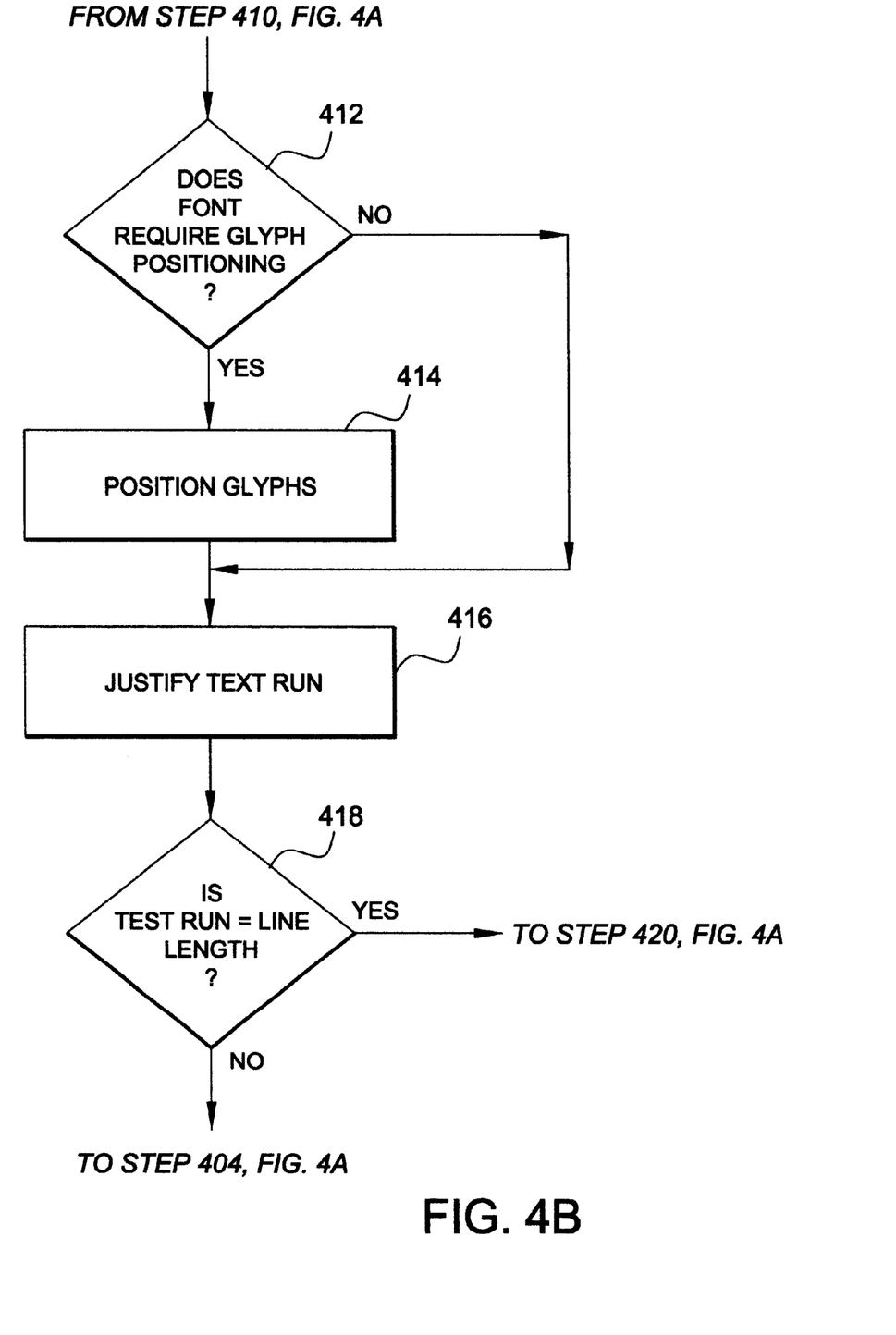

In step 412, the word processing program reviews the response from the layout services library to the justification information function call to determine whether the requested justification priority requires glyph positioning. If the justification priority requires glyph positioning, then in step 414 the word processing program issues a position glyph function call. The position glyph function call includes a parameter to indicate the justification priority. The layout services library returns glyph position information including x-placement values, y-placement values and advance values for the glyphs. If the justification priority does not require glyph positioning, then the method proceeds along the No branch from step 412 to step 416.

In step 416, the word processing program issues a justify text function call, specifying the justification priority and the target line length. The layout services library justifies the text run using the adjustments permitted by the justification priority and returns a list of justified placement values and a list of justified advance values. Once the word processing program receives the justification information from the layout services library, the word processing program verifies that the justified text run is equal to the line length in step 418. The word processing program issues a calculate length function call to determine the start position and the end position of the text run. The word processing program uses the start position and the end position to calculate the length of the text run. The length of the text run is then compared to the line length. If the length of the text run is equal to the line length, then justification is complete and the Yes branch is followed from step 418 to step 420.

If the length of the text run is not equal to the line length, then the No branch is followed back to step 404. In step 404, the word processing program selects a more severe justification priority and repeats steps 406–418. The method continues to repeat steps 406–418 until the text run is justified or until a justification error occurs. If the text run cannot be justified even though the justification priority is set to its most severe level, then the No branch is followed from step 406 to step 422 and a justification error is returned to the word processing program.

Layout Services Library Interface

The layout services library supports the paragraph layout and justification method described in connection with FIGS. 3, 4A and 4B. The layout services library provides a set of text processing functions for use by a word processing client. The layout services library typically includes font information functions, text layout functions and text information functions. The font information functions return information about the font, such as the supported scripts, language systems and features supported by the font. The text layout functions provide fundamental layout services including glyph substitution, glyph positioning and justification. The text information functions return information about the text within a given text run. A word processing program invokes the text processing functions provided by the layout services library via function calls. The layout services library returns information to the word processing program via a data structure. The data structure may include a pointer to a list of data.

The text information functions which support the paragraph layout method include the calculate length function and the character identification function. The calculate length function and the character identification function relieve the word processing program from the burden of converting glyph positions to character positions. The calculate length function is used to determine the length of the text run. The word processing client issues a calculate length function call and provides the layout services library with information about the text run, including glyph information, a list of advance distances for the text run, the index of the first character of the text run and the index of the last character of the text run. The layout services library determines the locations of the first and last characters of the text run. The layout services library returns an index into the glyph list for the first character, an index into the glyph list for the last character, the start position of the text run and the end position of the text run. For left-to-right layout, the start position describes the left or top of the first character and the end position describes the right or bottom of the last character of the text run. By comparing the start position and the end position to the line length, the word processing program can determine whether the text run exceeds the line length.

The paragraph layout method also uses the character identification function. The character identification function identifies the character at a given position. The word processing program uses this function when deciding where to break a text run. The word processing program provides information about the text run, a list of glyph flags, a list of advance values and a hit coordinate to the layout services library. The layout services library returns the index value of the character located at the hit coordinate. From the index value, the word processing program can identify the character. In the paragraph layout method, the word processing program typically uses the character identification function to locate a space character at or near the position corresponding to the line length.

The layout services library also supports the justification of the lines of a paragraph. Justification is supported by the justify information function and the justify text function. The justify information function is a font information function and the justify information text function is a text layout function. Justification may be implemented as progressive justification. Progressive justification utilizes justification priorities to control the actions taken to justify a line of text. A font developer defines justification priorities based on how the justification actions affect the appearance and function of the line of text. Lower justification priority numbers correspond to actions which are the least severe, and higher justification priority numbers correspond to actions which are the most severe.

The word processing client issues a justify information function call and provides the layout services library with the properties for the text run and a justification priority. The layout services library returns a priority support value. The priority support value is True if the justification priority level is supported by the font. If the justification level is not supported by the font, then the priority support value is False. If the justification priority level is supported by the font, then the layout services library also returns a glyph substitution change value and a glyph position change value. The glyph substitution change value is True if the justification priority level requires glyph substitution. Similarly, the glyph position change value is True if the justification priority level requires glyph positioning. If the justification level does not require glyph substitution or glyph positioning, then the glyph substitution change value and the glyph position change value are False.

In addition to the justify information function, the word processing program also uses the justify text function to justify a line of text. The word processing program issues a justify text function call and provides text run information, including a list of features, a justification priority level, a pointer to a list of glyphs, information on glyph flags, and a target line length. The layout services library returns a list of justified placement values and a list of justified advance values. The word processing client may use the justified placement values and the justified advance values to render justified text.

In summary, the present invention is directed toward a method for laying out and justifying a paragraph using a layout services library. The layout services library provides a set of text processing functions to support paragraph layout and justification. In one embodiment, the layout services library includes font information functions, text layout functions, and text information functions. Additional functions may be provided as will be apparent to those skilled in the art. Although the present invention has been described using an OpenType Layout font, the invention may be applied to other fonts.

Alternative embodiments will become apparent to those skilled in the art to which the present invention pertains without departing from its spirit and scope. Accordingly, the scope of the present invention is described by the appended claims and is supported by the foregoing description.

What is claimed is:

1. A method for laying out a paragraph using a predetermined line length, the paragraph comprising a plurality of characters, comprising the steps of:
 (a) defining all of the characters of the paragraph as a single text run;
 (b) laying out the text run as a single line by:
  (i) substituting glyphs for the characters of the paragraph; and
  (ii) positioning the glyphs in the single line;
 (c) once the text turn has been laid out as the single line, then determining a text run length for the laid out text run;
 (d) if the text run length for the laid out text run exceeds the line length, then dividing the text run into a parent text run and a child text run, the parent text run comprising a portion of the text run which does not exceed the line length and the child text run comprising a portion of the text run which exceeds the line length so that the division of the text run occurs after the glyphs have been substituted and positioned; and
 (e) determining a child text run length.

2. The method of claim 1 wherein, if the child text run length exceeds the line length, then
 repeating steps (c) through (e) using the child text run.

3. The method of claim 1, wherein the step of determining a text run length comprises:
 converting glyph position information to character position information; and
 determining the text run length using the character position information for a first character of the text run and a last character of the text run.

4. The method of claim 1, wherein the step of dividing the text run into a parent text run and a child text run comprises:
 converting glyph position information to character position information;
 using the character position information to identify a character located at a position which corresponds to the line length; and
 if the character is a space character, then dividing the text run at the space character.

5. The method of claim 1, further comprising the step of justifying the parent text run by determining justified glyph placement values and justified glyph advance values for the parent text run.

6. A computer-readable medium having computer-executable instructions for a paragraph layout interface comprising:
 (a) receiving a text run, the text run defining a paragraph having a plurality of characters;
 (b) laying out the text run by:
  (i) identifying a plurality of glyphs to substitute for the plurality of characters; and
  (ii) calculating an x-placement, y-placement and advance value for each of the glyphs, wherein the x-placement, y-placement and advance value are independent for each glyph;
 (c) once the text run has been laid out, determining coordinates for a first character of the text run and a last character of the laid out text run; and
 (d) if the coordinates for the first character of the text run and the last character of the text run indicate that the laid out text run exceeds a predetermined line length, then determining whether a character located at a point corresponding to the predetermined line length is a space character.

7. The computer-readable medium of claim 6, wherein the step of identifying a plurality of glyphs for the text run comprises accessing a glyph substitution font table.

8. The computer-readable medium of claim 6, wherein the step of calculating x-placement, y-placement and advance values for each of the glyphs comprises accessing a glyph position font table.

9. A computer-readable medium having computer-executable instructions for a laying out a paragraph comprising:
 (a) defining all of the characters of the paragraph as a single text run;

(b) requesting layout information for the text run, the layout information including glyph substitution information and glyph positioning information;

(c) using the layout information to layout the text run as a single line by:
  (i) using the glyph substitution information to substitute a plurality of glyphs for the plurality of characters; and
  (ii) using the glyph positioning information to position the plurality of glyphs;

(d) once the text run has been laid out as the single line, then requesting coordinates for a first character of the laid out text run and a last character of the laid out text run;

(e) using the coordinates for the first character of the text run and the last character of the text run to determine a text run length for the laid out text run;

(f) comparing the text run length to a predetermined line length;

(g) if the text run length exceeds the predetermined line length, then dividing the text run into a parent text run and a child text run, the parent text run comprising a portion of the text run which does not exceed the line length and the child text run comprising a portion of the text run which exceeds the line length; and (h) repeating steps (d) through (g) using the child text run.

10. The computer-readable medium of claim 9, wherein the dividing step comprises:
  requesting character identification information for a character located at a point corresponding to the predetermined line length; and
  if the character identification indicates that the character is a space character, then dividing the text run at the space character.

11. The computer-readable medium of claim 10, wherein if the character is not the space character, then backing up to a previous character and requesting character identification information for the previous character.

12. A method of communication between a client process and a server process for laying out a paragraph having a plurality of characters, comprising the steps of:
  defining, by the client process, the plurality of characters of the paragraph as a single text run, the text run having a first character and a last character;
  laying out the text run as a single line by:
    (i) substituting glyphs for the characters of the paragraph; and
    (ii) positioning the glyphs in the single line;
  once the text run has been laid out as the single line then determining whether the laid out text run exceeds a predetermined line length by:
  issuing, by the client process, a calculate length function call; receiving, by the server process, the calculate length function call and determining coordinates for the first character and the last character of the laid out text run;
  comparing, by the client process, the coordinates for the first character and the last character of the text run with the predetermined line length;
  if the laid out text run exceeds the predetermined line length, then dividing, by the client process, the text run into a parent text run and a child text run; and
  repeating the determining step using the child text run.

13. The method of claim 12, wherein the step of laying out the text run comprises:
  issuing, by the client process, a glyph substitution call;
  receiving, by the server process, the glyph substitution call and accessing a glyph substitution font table;
  issuing, by the server process, a glyph list of glyph substitution information;
  issuing, by the client process, a glyph positioning call;
  receiving, by the server process, the glyph positioning call and accessing a glyph position font table; and
  issuing, by the server process, a position array including glyph position information.

14. The method of claim 13, wherein the dividing step comprises:
  selecting, by the client process, a character at a point corresponding to the predetermined line length as a selected character;
  issuing, by the client process, a character identification call to identify the selected character;
  receiving, by the server process, the character identification call and determining an index value to identify the selected character;
  if the selected character is a space character, then dividing, by the client process, the text run at the space character; and
  if the selected character is not a space character, then selecting, by the client process, a previous character as a second selected character and repeating the issuing step and the receiving step with the second selected character.

15. The method of claim 12, further comprising the step of justifying the parent text run by:
  issuing, by the client process, a justification function call;
  receiving, by the server process, the justification function call and accessing a justification font table; and
  issuing, by the server process, an array including justified glyph placement values and justified glyph advance values.

16. A method of communication between a client process and a server process, comprising the steps of:
  issuing, by the client process, a justification information call, the justification information call including a justification priority and identifying a text run that has been laid out;
  receiving, by the server process, the justification information call;
  accessing, by the server process, a font justification table to determine whether the justification priority is supported by a font associated with the text run; and
  issuing, by the server process, a justification information response, the justification information response indicating whether the justification priority is supported, and if the justification priority is supported, whether glyph substitution or glyph positioning is required.

17. A method of communication between a client process and a server process, comprising the steps of:
  defining, by the client process, a text run comprising a plurality of glyphs that has been laid out;
  issuing, by the client process, a justify text function call, the justify text function call including a justification priority level and a target line length for the text run;
  receiving, by the server process, the justify text function call;
  accessing, by the server process, a glyph position font table to determine a justified placement value and a justified advance value for each of the glyphs of the text run; and issuing, by the server process, a justification array, the justification array including the justified placement value and the justified advance value for each of glyphs in the text run.

18. The method of claim 17, further comprising the steps of:

accessing, by the server process, a glyph substitution font table to determine a substituted glyph for a selected glyph of the text run; and issuing, by the server process, the justification array including the substituted glyph.

19. The method of claim 17, wherein if the justified text run does not equal a predetermined line length, then repeating, by the client process, the step of issuing a justify text function call using a more severe justification priority level.

* * * * *

UNITED STATES PATENT AND TRADEMARK OFFICE
CERTIFICATE OF CORRECTION

PATENT NO.    : 6,321,243 B1                                       Page 1 of 1
DATED         : November 20, 2001
INVENTOR(S)   : Dean Ballard It is certified that error appears in the above-identified patent and that said Letters Patent is hereby corrected as shown below:

Title page,
Item [56], References Cited, U.S. PATENT DOCUMENTS,
-- 5,440,745      8/1995  Platte et al. -- has been inserted,
-- 5,289,169      2/1994  Corfield et al. -- has been inserted, FOREIGN DOCUMENTS,
-- 0 313 399              4/1989  EPO -- has been inserted,
-- 0 575 164 A2          12/1993  EPO -- has been inserted, OTHER PUBLICATIONS,
-- TrueType Open Font Specification, "March 1995 including July 1995 revisions,
   pp. 6-170. -- has been inserted;

Column 11,
Line 65, "turn" has been replaced with -- run --;

Signed and Sealed this

Twenty-fourth Day of December, 2002

JAMES E. ROGAN
*Director of the United States Patent and Trademark Office*